United States Patent
Buri

(10) Patent No.: US 6,779,416 B2
(45) Date of Patent: Aug. 24, 2004

(54) SHIFTING DEVICE FOR A TRANSMISSION COMPRISING TWO LAYSHAFTS

(75) Inventor: Gerhard Buri, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/258,870

(22) PCT Filed: Apr. 28, 2001

(86) PCT No.: PCT/EP01/04814
§ 371 (c)(1),
(2), (4) Date: Oct. 25, 2002

(87) PCT Pub. No.: WO01/84005
PCT Pub. Date: Nov. 8, 2001

(65) Prior Publication Data
US 2003/0121342 A1 Jul. 3, 2003

(30) Foreign Application Priority Data
May 4, 2000 (DE) .......................... 100 21 761

(51) Int. Cl.⁷ .......................... F16H 3/095; F16D 23/06
(52) U.S. Cl. .............................. 74/331; 74/333; 74/339
(58) Field of Search .......................... 74/325, 331, 333, 74/339

(56) References Cited
U.S. PATENT DOCUMENTS

| 3,283,613 | A | | 11/1966 | Perkins .......................... 74/745 |
|---|---|---|---|---|
| 3,583,536 | A | | 6/1971 | Magnier .......................... 192/53 A |
| 4,484,899 | A | | 11/1984 | Haarmann .......................... 464/69 |
| 4,727,764 | A | * | 3/1988 | Klaue .......................... 74/331 |
| RE33,551 | E | * | 3/1991 | Andersson et al. .......................... 74/331 |
| 5,370,014 | A | * | 12/1994 | Pigozzi et al. .......................... 74/331 |
| 5,609,062 | A | * | 3/1997 | Reynolds .......................... 74/325 |
| 5,749,263 | A | | 5/1998 | Buri et al. .......................... 74/331 |
| 5,839,319 | A | | 11/1998 | Dutson .......................... 74/339 |
| 5,927,146 | A | | 7/1999 | Dutson .......................... 74/333 |
| 6,073,506 | A | * | 6/2000 | Wireman .......................... 74/331 |

FOREIGN PATENT DOCUMENTS

| DE | 31 51 401 C2 | 9/1991 | ............. F16D/3/04 |
|---|---|---|---|
| DE | 43 05 103 A1 | 9/1994 | ............. F16H/3/093 |
| DE | 197 27 321 A1 | 11/1998 | ............. F16D/3/78 |
| EP | 0 714 802 A2 | 6/1996 | ............. F16H/3/095 |
| JP | 60201148 A | 10/1985 | ............. F16H/3/48 |

* cited by examiner

*Primary Examiner*—Ankur Parekh
(74) *Attorney, Agent, or Firm*—Davis & Bujold PLLC

(57) ABSTRACT

A transmission (68) with load distribution to two countershafts (70, 72) has a switching equipment (2) with a synchronization apparatus (14, 54) and two constant gear wheel trains (42, 44) of which at least one constant gear wheel train (42) serves to transfer torque introduced into the transmission (68) to that countershaft (70) on which an auxiliary output (PTO) is arranged. The gear wheel (40) of the second constant gear wheel train (42), which is not arranged on one of the countershafts (70, 72), is fixed radially in a coupling apparatus (32, 62, 64) such that the coupling apparatus (32, 62, 64) allows radial play of the gear wheel (40) in relation to the shaft (4) on which the gear wheel (40) is arranged. An Oldham clutch (32) represents such a coupling apparatus.

9 Claims, 4 Drawing Sheets

SHIFTING DEVICE FOR A TRANSMISSION COMPRISING TWO LAYSHAFTS

FIELD OF THE INVENTION

The invention concerns a switching equipment for a transmission with load distribution on two countershafts.

BACKGROUND OF THE INVENTION

With a gear shift transmission with load distribution on several countershafts, with a coaxial drive shaft that is mounted radially and axially, and with an output shaft (main shaft), that is mounted floating, whereby at least one drive gear wheel provided on the drive shaft passes torque to gear wheels meshing with it and connected tightly with the countershaft. The idler wheels are axially fixed to the drive and output shaft, but are radially free.

With transmissions of this type, with at least two countershafts, the load balancing is generally configured in such a way that the drive shaft and the countershafts are mounted rigidly in relation to the housing while the main shaft or output shift is mounted floating radially on the gear wheels allocated to it, which is situated in the flux of force, and is only axially fixed into position. Basically, however, the converse construction or shaft guidance is also possible. If torque diminishes on only one countershaft, which is usually the case with an auxiliary output connection, radial and axial forces arise on an inclined geared gear engagement on the drive shaft. In order to be able to absorb these, the gear wheel situated in the flux of force must be guided to the drive shaft. All idler wheels on the drive shaft and on the output shift are only axially fixed into position, but are radially free for a functioning load compensation. The necessary load compensation is disturbed or a functioning of the gearshift transmission is not possible at all if an asymmetrical power application occurs. This is, for example, the case if an auxiliary output is to take place over only one countershaft.

A shiftable radial fixation for a constant gear wheel is known from DE 43 05 103 A1 in which the switching equipment which introduces the constant gear wheel into the torque flux also contains a device for a radial fixation of the shifted constant gear wheel. The switching equipment nonetheless only permits a radial fixation and use of the first constant because the shaft deflection of the drive shaft becomes too great with an operation over the second constant.

Underlying the invention is the objective of enabling the drive of an auxiliary output through the second constant.

SUMMARY OF THE INVENTION

The switching equipment of the invention for a transmission with load distribution on two countershafts has two constant gear wheel trains. At least one of the constant gear wheel trains serves for the transmission of torque which is introduced into the transmission to that countershaft on which the auxiliary output is arranged. The switching equipment, furthermore, has a synchronizing apparatus. The constant gear wheel trains have three gear wheels, two of which are arranged on the countershaft, while the third gear wheel is arranged axially fixed but radially mobile on the input shaft or the output shaft of the transmission. The gear wheel of the second constant gear wheel train not arranged on one of the countershafts is fixed radially in a clutch apparatus such that the clutch apparatus permits radial play of the gear wheel in relation to the shaft on which the gear wheel is arranged. In an especially advantageous refinement, an Oldham type clutch is provided between the synchronization apparatus and the gear wheel of the second constant gear wheel train which is not arranged on one of the countershafts.

If the torque introduced into the transmission, through the switching equipment, is shifted from the input shaft of the transmission to the gear wheel of the second constant gear wheel train that is not mounted on one of the countershafts, then the two tooth flanks of the teeth engaging, in any given case, are braced upon the tooth flanks of the corresponding matching gear wheels of the countershafts. Through the radial fixation of the gear wheel of the second constant gear wheel train in the clutch apparatus, the gear wheel can no longer fall back radially. The gear wheel of the first constant gear wheel train which is not arranged on the countershaft forms a coupling member owing to its radial mounting between the two countershafts, and in this way the result is a form-locking feedback coupling of the countershaft, to which the auxiliary output is connected, on the opposite-lying and previously unstressed countershaft. As a consequence of this feedback coupling, the gear forces of the gear wheel of the second constant gear wheel train is distributed to both countershaft equally by halves and carried back again to the countershaft to which the auxiliary output is connected. The complete torque is therewith available on the countershaft to which the auxiliary output is connected.

In one embodiment, driving noses are provided on the gear of the second constant gear wheel train which engage into a slide ring on the Oldham type clutch, and in one refinement, driver noses are also arranged in a coupling element of the synchronizing apparatus which engage with the slide rings on the Oldham type clutch. In a further advantageous embodiment, a disk joint is provided between the synchronizing apparatus and the gear wheel of the second constant gear wheel train which is not arranged on one of the countershafts. In one embodiment, the driver noses are provided on the gearwheel of the second constant gearwheel train which engage into disks and chain members of the disk joint, and in one refinement, driver noses are also arranged on a coupling element of the synchronizing apparatus that engage into the disks and chain members of the disk joint. In one construction, the synchronization apparatus is provided as a bolt synchronization, and the clutch gearing is arranged between the bolt synchronization and the gear wheel of the second constant gear wheel train which is not arranged on one of the countershafts, is constructed such that positioning inexactitudes between the gearings of the first and second constants are balanced. An advantageous embodiment has a needle-mounted gear wheel of the first constant gear wheel train (which is not arranged on one of the countershafts) on the input shaft.

BRIEF DESCRIPTION OF THE DRAWINGS

The invention will now be described, by way of example, with reference to the accompanying drawings in which.

DETAILED DESCRIPTION OF THE INVENTION

Figure 1:
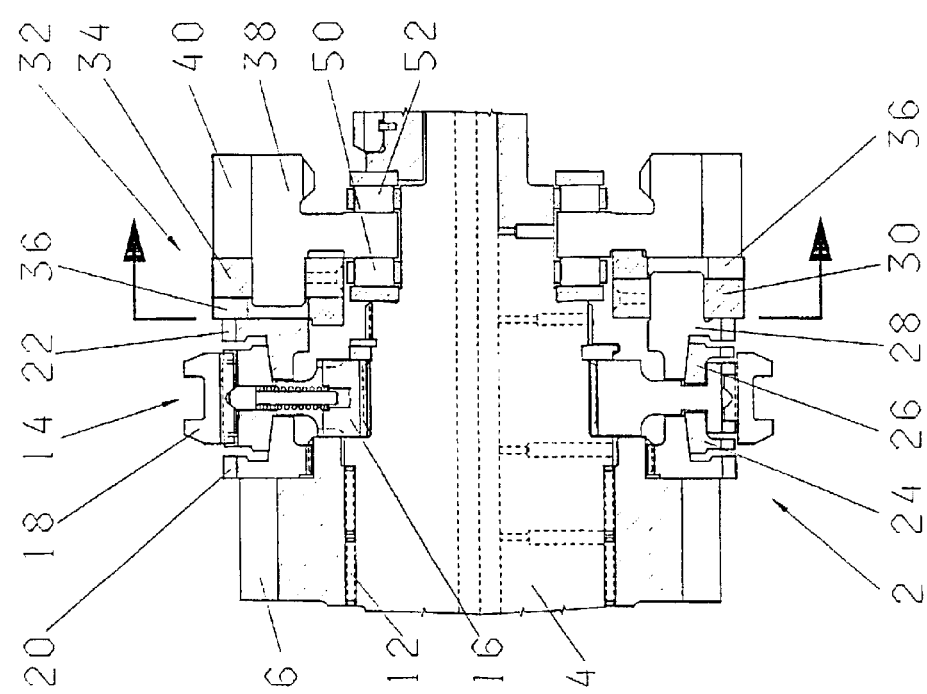
FIG. 1 depicts a section through a switching equipment with an Oldham clutch.
Figure 4A:
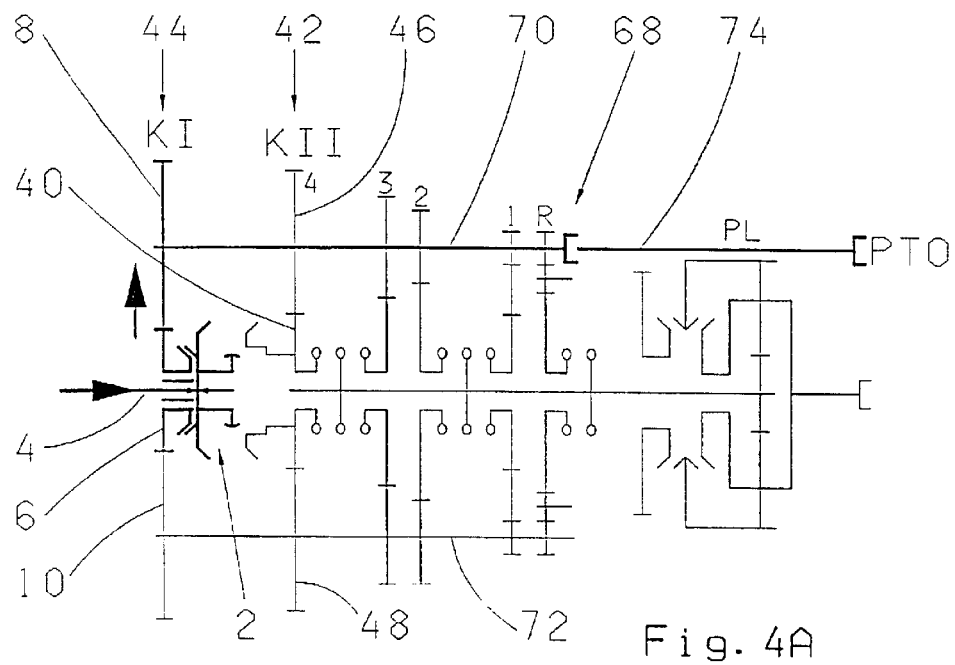
FIG. 4 provides a representation of the torque flux.

FIG. 1 depicts switching equipment 2 for a transmission with an input shaft 4 on which a gear wheel 6, of a first constant gear wheel train 44, is rotatably arranged. The first constant gear wheel train 44 has gear wheels 6, 8 and 10 (FIG. 4A). Gear wheel 6 is mounted on a needle bearing 12 on input shaft 4. A synchronization apparatus 14 has a synchronous element 16 arranged torsion-resistant on the input shaft 4 on which a clutch sleeve 18 can be moved axially along the axis of rotation of the input shaft 4. A coupling element 20 or 22 and one synchronous ring 24 or 26 is arranged on each side each of the synchronous element 16. The coupling element 22 has two driver noses 28, one driver nose 28 of which is depicted in FIG. 1. These driver noses 28 engage, in any given case, though a slide ring 30 of an Oldham clutch 32. The Oldham clutch 32 has, in addition, two further slide rings 34 which interact with the clutch disk 36 of the Oldham clutch 32, just like the slide rings 30. Through these slide rings 34, the driver noses 38 engage with a gear wheel 40 of a second constant gear wheel train 42. The second constant gear wheel train 42 has gear wheels 40, 46 and 48 (FIG. 4A). Gearwheel 40 is axially mounted on the input shaft 4, between two roller bearings 50 and 52, but nonetheless has radial play.

Figure 2:
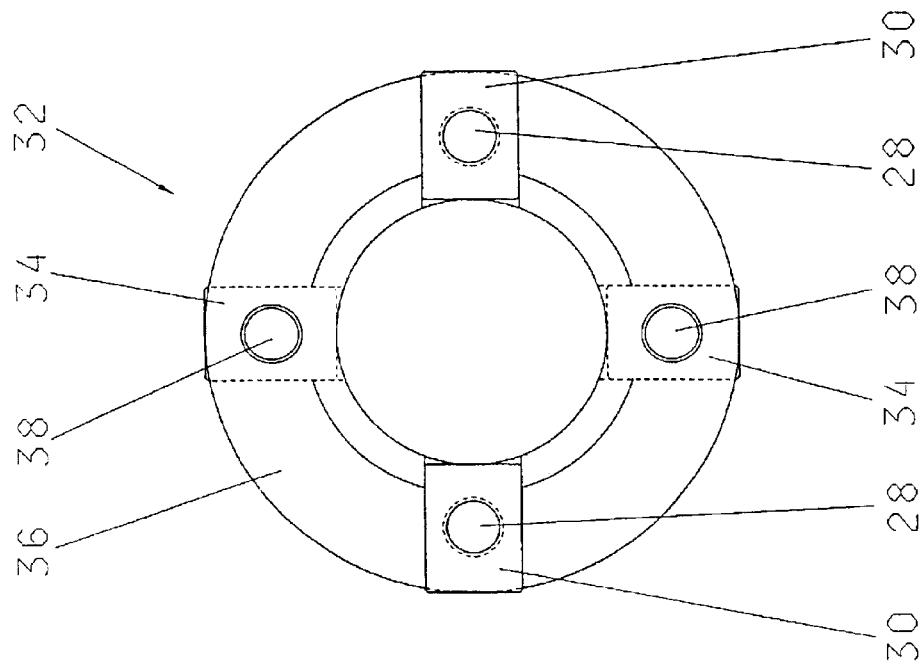
FIG. 2 reveals a section according to FIG. 1.

In FIG. 2, the clutch disk 36 of the Oldham clutch is represented according to the section of FIG. 1. Moreover, the driver noses 28 are well recognizable on the coupling element 22 and the driver noses 38 on gear wheel 40 in slide rings 30 or 34.

Figure 3:
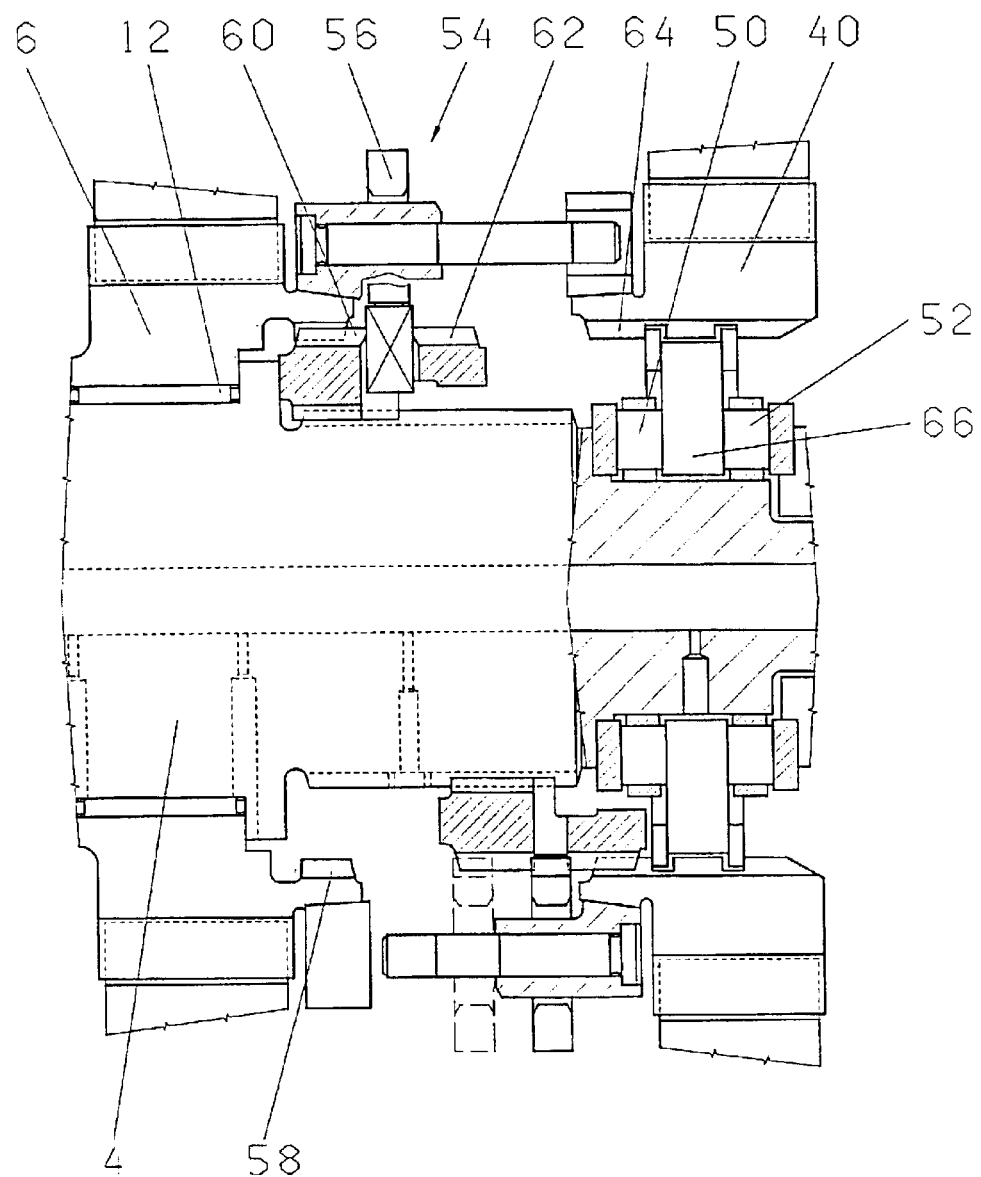
FIG. 3 shows switching equipment with a bolt synchronization.

In FIG. 3, a bolt synchronization 54 is represented. Gear wheel 6 of the first constant gear wheel train 44 is rotatably arranged on a needle bearing 12 of the input shaft. For connection of gear wheel 6 and input shaft 4, a disk 56 of the bolt synchronization 54 is moved, in the upper half of FIG. 3 to the left of the drawing plane, so that the clutch gearing 58 of gear wheel 6 can engage with the clutch gearing 60 on disk 56. The gear wheel 40 is axially mounted between roller bearings 50 and 52 on a disk 66 on input shaft 4, but has play in the radial direction. If the disk 56 is moved to the right in the drawing plane, as represented in the lower half of FIG. 3, then clutch gearing 62 on the disk 56 engages with the clutch gearing 64 on gear wheel 40. The clutch gearing is moreover constructed such that a positioning error compensation takes place for the gearings of the constant gear wheel trains 42 and 44.

Figure 4B:
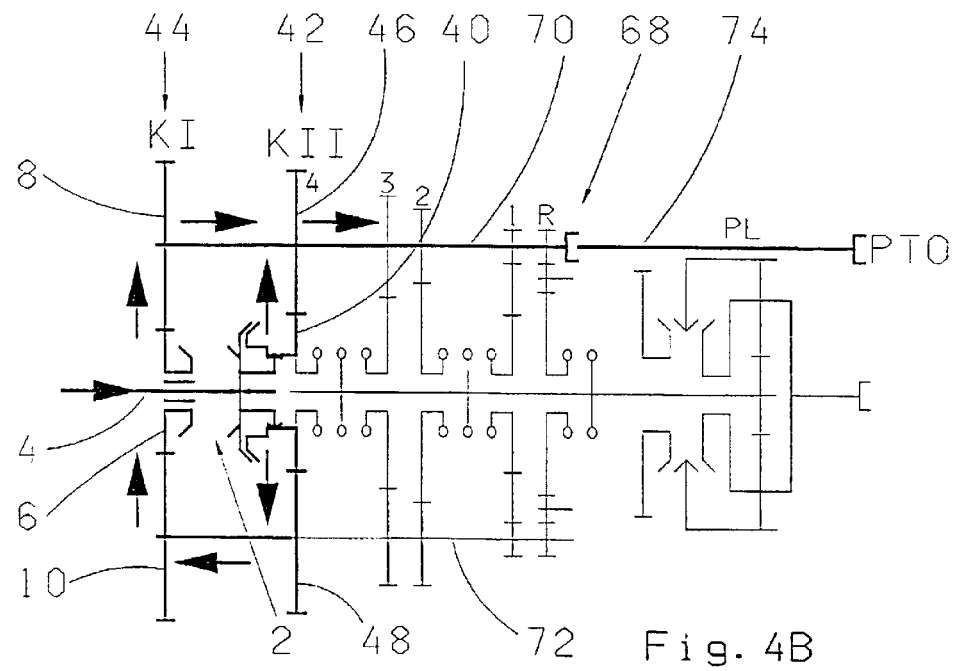

FIG. 4A depicts the torque flux of a transmission 68 with two countershafts 70 and 72. When introducing the first constant gear wheel train 44, which consists of gear wheels 6, 8 and 10, into the torque transfer, the torque flows from the input shaft 4 into the switching equipment 2 to gear wheel 6 and from there over gear wheel 8 to countershaft 70. An auxiliary PTO (Power Take Off) output is connected with countershaft 70 through an intermediate shaft 74. Engaging the second constant gear wheel train 42, which consists of gear wheels 40, 46 and 48, into the torque transfer is shown in FIG. 4B, whereby the torque first flows from the input shaft 4 through the switching equipment 2 to gear wheel 40. Gear wheel 6 of the first constant gear wheel train 44 forms a coupling member between the two countershafts 70 and 72 and, in this way, there results a form-locking feedback coupling of countershaft 70 to which the auxiliary PTO output is connected to the opposite-lying and previously unloaded countershaft 72. As a consequence of this feedback coupling, the gear forces of gear wheel 40 of the second constant gear wheel train 42 are distributed on both countershafts 70 and 72 equally by halves and are conducted back again to the first countershaft 70 through constant gear wheel train 44. The entire torque therewith is available on the countershaft 70 to which the auxiliary PTO output is connected. The torque flux is supposed to be indicated by the arrows used.

Figure 5:
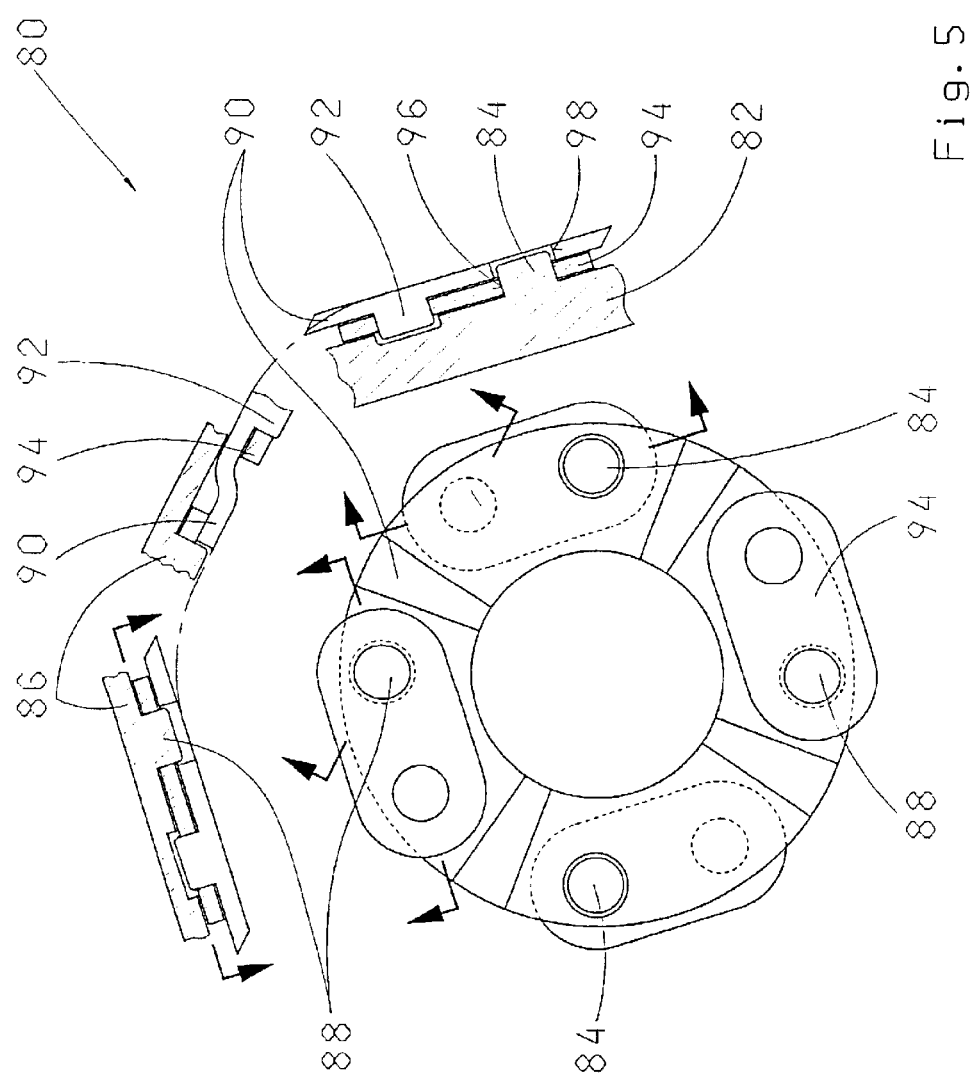
FIG. 5 illustrates a disk joint.

FIG. 5 shows a disk joint 80. A gear wheel 82 has two driver noses 84 arranged opposite each other. Each driver nose 84 engages, at all times, through one opening 96 of a chain member 94 provided with two openings 96 and through an opening 98 in a clutch disk 90. The driver nose 84 is arranged with play in opening 98. The clutch disk 90 has driver noses 92 which always project in each case through one opening 98 in a chain member 94. Four chain members 94 are provided. A coupling element 86 has two driver noses 88 arranged lying opposite each other. Each driver nose 88 engages, in each case, through the opening 96 of the chain member 94 which still remains free and through an opening 98 in a clutch disk 90. The driver nose 88 is arranged with play in opening 98. The interaction of gear wheel, clutch disks 90, chain members 94 and coupling elements 86 allows radial play of the gear wheel 82 on a shaft, not depicted here, which bears the gear wheel 82.

Reference Numbers
2 Switching equipment
4 Input shaft
6 Gear wheel
8 Gear wheel
10 Gear wheel
12 Needle bearing
14 Synchronization apparatus
16 Synchronous element
18 Clutch sleeve
20 Coupling element
22 Coupling element
24 Synchronous ring
26 Synchronous ring
28 Driver nose
30 Slide ring
32 Oldham clutch
34 Slide ring
36 Clutch disk
38 Driver nose
40 Gear wheel
42 Constant gear wheel train
44 Constant gear wheel train
46 Gear wheel
48 Gear wheel
50 Roller bearing
52 Roller bearing
54 Bolt synchronization
56 Disk
58 Clutch gearing
60 Clutch gearing
62 Clutch gearing
64 Clutch gearing
66 Disk
68 Transmission
70 Countershaft
72 Countershaft
74 Intermediate shaft
80 disk joint
82 Gear wheel
84 Driver nose
86 Coupling element
88 Driver nose
90 Clutch disk
92 Driver nose
94 Chain member
96 Opening
98 Opening
PTO Auxiliary output

What is claimed is:

1. A switching equipment (2) for a transmission (68) with load distribution on a first countershaft (70) and a second countershaft (72); comprising:
- a first constant gear wheel train (44); and
- a second constant gear wheel train (42); wherein
  - the first constant gear wheel train (41) the second constant gear wheel train (42) each include at least one countershaft gear wheel mounted on a corresponding one of the first countershaft (70) and the second countershaft (72);
- an auxiliary output (PTO) arranged on the first countershaft (70);
  - at least one of the first constant gear wheel train (44) and the second constant gearwheel train (42) transfers a torque input to the first countershaft (70); and
- a clutch gear wheel (40, 82) of one of the first constant gear wheel train (44) and the second constant gear wheel train (42);
  - the clutch gear wheel (40, 82) being mounted on a third shaft (4) and fixed axially in a coupling apparatus (32, 62, 64, 80) such that the coupling apparatus (32, 62, 64, 80) permits radial play of the clutch gear wheel (40, 82) in relation to the third shaft (4); and
  - the coupling apparatus (32, 62, 64, 80) is engaged between a synchronization apparatus (14) and the clutch gear wheel (40, 82).

2. The switching equipment (2) according to claim 1, wherein the coupling apparatus (32) is an Oldham coupling apparatus.

3. The switching equipment (2) according to claim 2, wherein the clutch gear wheel (40, 82) has driver noses (38) which engage into a slide rings (34) of the Oldham coupling apparatus (32).

4. The switching equipment (2) according to claim 2, wherein a coupling element (22) of the synchronization apparatus (14), which engage with slide rings (30) of the Oldham coupling apparatus (32), has driver noses (28) which facilitate engagement therewith.

5. The switching equipment (2) according to claim 1, wherein a disk joint (80) forms the coupling apparatus between the synchronization apparatus (14) and the clutch gear wheel (40, 82) of the one or the first constant gear wheel train (44) and the second constant gear wheel train (42).

6. The switching equipment (2) according to claim 5, wherein the disk joint (80) has chain members (34) and clutch disks (90), and the clutch gear wheel (40, 82) has driver noses (84) which engage with the chain members (94) and the clutch disks (90) on the disk joint (80).

7. The switching equipment (2) according to claim 5, wherein one coupling element (86) of the synchronization apparatus (14), which engages with chain members (94) and clutch disks (90) on the disk joint (80), has driver noses (88) which facilitate engagement therewith.

8. The switching equipment (2) according to claim 1, wherein a bolt synchronization (54) is provided is the synchronization apparatus, and clutch gearing (62, 64) is arranged between the bolt synchronization (54) and the clutch gear wheel (40, 82) of the one of the first constant gear wheel train (44) and the second constant gearwheel train (42), wherein the clutch gearing (62, 64) is constructed such that the positioning exactitudes between the gears of the first and second constant gear wheel trains (44, 42) are balanced.

9. The switching equipment (2) according to claim 1, wherein the clutch gear wheel (6) of the one of the first constant gear wheel train (44), and the second gear wheel train (42) is mounted on an input shaft (4) via a needle bearing (12).

* * * * *